United States Patent [19]

Reggiani

[11] Patent Number: 5,280,267
[45] Date of Patent: Jan. 18, 1994

[54] PASSIVE ACTION ANTITHEFT DEVICE

[76] Inventor: Medardo Reggiani, 24, Via A. Aleardi, I 42100 Reggio Emilia, Italy

[21] Appl. No.: 900,438

[22] Filed: Jun. 18, 1992

[30] Foreign Application Priority Data

Jul. 1, 1991 [IT] Italy .............................. RE91A00044

[51] Int. Cl.$^5$ .............................................. B60R 25/10
[52] U.S. Cl. ...................................... 340/426; 180/287
[58] Field of Search ............... 340/426, 430; 307/10.2, 307/10.3, 10.5, 10.6; 180/287

[56] References Cited

U.S. PATENT DOCUMENTS

| | | | |
|---|---|---|---|
| 4,652,860 | 3/1987 | Weishaupt et al. | 340/426 |
| 4,738,334 | 4/1988 | Weishaupt | 340/426 |
| 4,754,255 | 6/1988 | Sanders et al. | 340/430 |
| 4,931,664 | 6/1990 | Knoll | 340/426 |
| 5,055,701 | 10/1991 | Takeuchi | 307/10.2 |

FOREIGN PATENT DOCUMENTS

| | | | |
|---|---|---|---|
| 0314143 | 5/1989 | European Pat. Off. | |
| 2423015 | 12/1979 | France | 340/426 |
| 2051442 | 1/1981 | United Kingdom | 340/426 |
| 2233487 | 1/1991 | United Kingdom | 340/426 |

*Primary Examiner*—Brent Swarthout

[57] ABSTRACT

An antitheft device for vehicles includes a central unit able to inhibit or enable normal function of the vehicle engine responsive to a coded radio signal emitted by a portable unit activated by a radio signal emitted by the central unit. The central unit includes a first memory, a device to transmit at a first frequency a first coded radio signal, CODE 3 chosen at random from a list of codes stored in the first memory device and to receive and recognize a second coded radio signal CODE 4. The portable unit includes a control and command device including a second memory device to receive and recognize the first coded radio signal, CODE 3, emitted by the central unit, a device to transmit at a second frequency a second coded radio signal, CODE 4, chosen in a list of codes stored in said second memory and tied to the first coded radio, signal CODE 3. The central unit is able to command the deactivation of the device which inhibits the engine of the vehicle responsive to the said second coded radio signal.

10 Claims, 3 Drawing Sheets

PASSIVE ACTION ANTITHEFT DEVICE

FIELD OF INVENTION

This disclosure relates to vehicle antitheft devices.

Vehicle antitheft devices are known, activated by remote control which are installed in the vehicles.

BACKGROUND OF THE INVENTION

These are of the types which comprise:

(1) a central electronic unit mounted in the vehicle and powered by its battery, which can be activated to: activate or deactivate;

(2) a device which, when activated, blocks the operation of the vehicle's engine;

(3) a small; self-contained, battery powered transmitting unit, activated by a push button, carried by the user when he leaves the vehicle.

By pressing the push-button, the user sends a coded signal, at a single high frequency, which is received by the central unit. If the code is correct, the central unit will activate or deactivate the device which blocks operation of the vehicle engine.

Other systems are known, where an electronic key substitutes for the transmitting circuit in order to deactivate operation of the vehicle engine. Both of these systems are inconvenient to use.

With a transmitter activated system it is necessary for the user to consciously generate the signal which activates or deactivates the device which blocks operation of the vehicle engine. Therefore, if he forgets to consciously activate the antitheft system, the vehicle will be either partially or totally unprotected.

It is also possible for potential thieves to discover the code by monitoring the radio transmission from some distance, usually on the order of tens of meters, and recording the user's transmission when he uses his own transmitter.

The system activated and deactivated by the electronic key requires the conscious insertion and removal of the key itself in order to deactivate or activate the antitheft system, and if one forgets to remove the electronic key the vehicle will be unprotected.

UK-A-2051442 discloses a security system for a car comprising a control unit for installation in the car and a portable unit to be carried by the driver, which transmits, on recognizing a uniquely coded first signal transmitted by the control unit, a uniquely coded second signal to the control unit. The latter, on recognizing it cancels the disablement of car engine operation.

The security system above presents the drawback that it is also possible to discover the electronic key's code, using an easily obtained suitable measuring device, if one has access to the key itself for a few minutes.

SUMMARY OF THE INVENTION

The inconveniences noted above have been overcome according to the invention by a security device comprising two parts, one the central unit which is the control unit, to be mounted in the vehicle and the other the control and command device which is a portable unit to be carried by the user. The latter would be carried with the ignition key and would, with the part mounted in the vehicle, become a unified device with either part capable of recognizing the other. This mutual recognition occurs automatically with no intervention on the part of the user, and is necessary for the deactivation of the antitheft device.

The aforementioned antitheft device, therefore, comprises a central unit carried by the vehicle and a control and command device which are the portable carried by the user.

The central unit includes a standard microprocessor programmed to generate, on command, a first frequency (f1) in the range of 130 KHz by means of a helical antenna normally called a loop antenna. This central unit is also used to enable or disable the antitheft system in its normal way.

The signal to disable the unit controlling the normally energized engine blocking device is emitted only after the reception and the recognition of a coded radio signal at a second frequency (f2), for example at 300 MHz, coming from the outside from the portable unit normally carried with the ignition key.

This portable unit also has a loop antenna and circuitry capable of receiving the first frequency (f1) transmitted by the central unit in a form and fashion to be described below.

The central unit with the means provided therein emits signals and codes to which only its portable unit should respond.

This sequence of code exchanges is as follows.

The central unit transmits a code CODE1 for its portable unit on frequency (f1).

When the appropriate portable unit receives its code it replies with CODE2 on frequency (f2).

As soon as the central unit receives CODE2 from the portable unit, the central unit transmits a first coded radio signal CODE3 on frequency (f1).

CODE3 is chosen at random from a list of code words stored in a memory, e.g. a EEPROM or a ROM of the said central unit.

The portable unit also possesses a list of these CODE3 words stored in a memory, e.g. a EEPROM or a ROM of the portable unit, and tied to corresponding CODE4 words stored and will respond with the code word associated with the CODE3 it has received.

The code sent by the portable unit in response to CODE3 is called CODE4 and is sent on frequency (f2). All coded exchanges must occur in the form of a "handshake" within a limited time window.

These signals could be exchanged on the same frequency, but only if means were provided to assure that the codes do not overlap or conflict with each other.

Widely separate frequencies can, however, be used in order to reduce the possibility of intercepting and decoding the communication protocol.

A preferred, not exclusive, embodiment of the invention is given here below, with the aid of the drawings.

DESCRIPTION OF PREFERRED EMBODIMENTS

Figure 2:
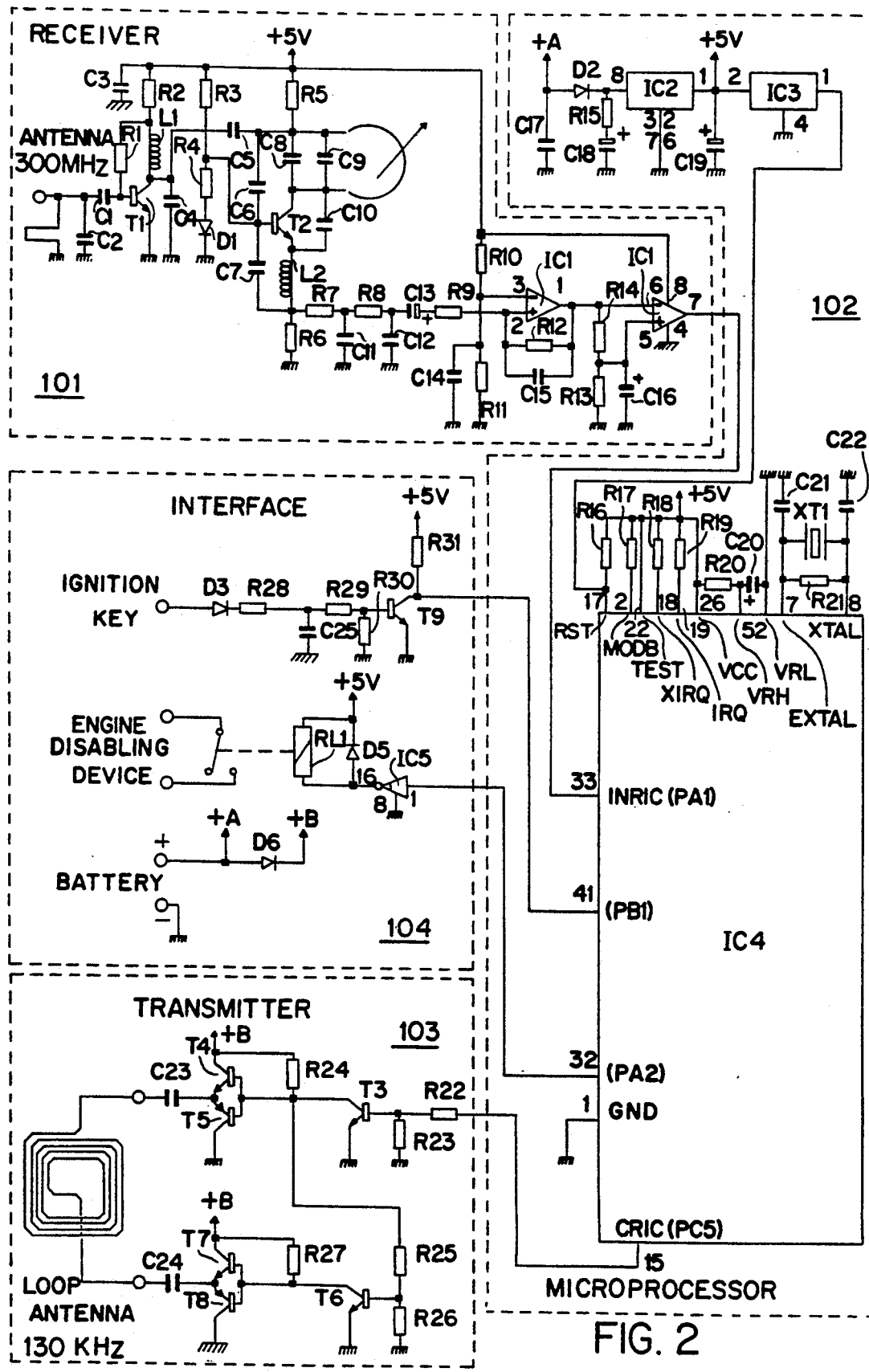
FIG. 2 is the general schematic of the central unit as ready to be installed in the vehicle.

In FIG. 2 there are four main blocks which go together to make the central electronic unit (100) which is then placed in the vehicle, preferably under the dashboard.

Also included is a block (101), called the receiver, which is a classic superregenerative four stage receiver tuned to 300 MHz.

The amplification stages, consisting of the components labeled C1, C2, C3, R1, T1, L1, R2, and C4, make up the input LC filter which resonates at 300 MHz and in a common emitter configuration has a gain of 10 db.

The receiver stage, as is clearly shown in the figure, comprises these components: R3, R4, D1, C5, C6, C7, C8, C9, C10, T2, L2, R5, R6.

The receiver tuning coil is part of the printed circuit and has the following dimensions:

length × width = 15 mm × 20 mm, thickness = 1.6 mm.

The tuning is accomplished experimentally by adjusting the values of C8 and C9.

The demodulator/amplifier stage comprises R7, C11, R8, C12, C13, R9, R10, R11, C14, IC1 (1,2,3), R12, and C15.

The squaring stage is accomplished by means of a comparator.

The combination of R14/R13 determines the threshold level and is maintained constant by C16.

The output signal is digital and is connected directly to the microprocessor, which constitutes block 102.

Microprocessor block 102 is the system's controlling element, which is provided with the received signal, and is able to shape and generate the signal required by the transmitter (103).

The block (102) is made up of components IC4, XT1, C21, C22, C20, R16, R17, R18, R19, R20, R21, as well as the 5 volt regulator and the reset circuit comprising IC2, IC3, C19, C17, D2, R15, C18. IC4, IC2 and IC3 are integrated circuits.

The transmitter block (103), can clearly be seen in the figure, (comprising R22, R23, T3, R24, T4, T5, C23, R25, R26, T6, R27, T7, T8, and C24) has a bridge circuit which allows it to place the greatest possible voltage on the loop antenna at the very low frequency.

Capacitors C23 and C24 block the signal's direct current (DC) component and also help to form a resonant circuit in series with the loop antenna.

Transistors T3 and T6 work as a level shifter. T6 is also a signal inverter which helps provide two equal signals 180° out of phase with each other.

The very low frequency loop antenna comprising a coil whose diameter is 100 mm and whose cross section is 1 mm².

The microprocessor block (102) is connected to the vehicle's electrical system by means of an interface block (104).

The interface block includes the following:
  A circuit connected to the starter motor portion of the ignition switch and comprising D3, R28, C25, R29, R30, T9, R31.
  A circuit to control the vehicle's engine blocking device which, for simplicity, is shown as relay RL1 along with the associated components D4, IC5 (16,1).
  A circuit to activate an alarm comprising D5, and IC5 (15,2)
  A circuit to protect against improper battery attachment consisting of D6.

All of the above-mentioned components are specified in TABLE 1, which follows:

TABLE 1

| | | | |
|---|---|---|---|
| C1 | 22 pF | | |
| C2 | 6.8 pF | | |
| C3 | 10 nF | | |
| C4 | 8.2 pF | | |
| C5 | 8.2 pF | | |
| C6 | 68 pF | | |
| C7 | 470 pF | | |
| C8 | 6.8 pF | | |
| C9 | 6.8 pF | | |
| C10 | 3.3 pF | | |
| C11 | 10 nF | | |
| C12 | 10 nF | | |
| C13 | 10 uF | | ELECTROLYTIC |
| C14 | 10 nF | | |
| C15 | 68 pF | | |
| C16 | 22 uF | | ELECTROLYTIC |
| C17 | 100 nF | | |
| C18 | 220 uF | 100 V | ELECTROLYTIC |
| C19 | 10 uF | 16 V | TANTALUM |
| C20 | 2.2 uF | 16 V | TANTALUM |
| C21 | 33 pF | | |
| C22 | 33 pF | | |
| C23 | 47 nF | 300 V | |
| C24 | 47 nF | 300 V | |
| C25 | 100 nF | | |
| R1 | 100 KOHM | | |
| R2 | 1 KOHM | | |
| R3 | 3.9 KOHM | | |
| R4 | 18 KOHM | | |
| R5 | 10 KOHM | | |
| R6 | 3.9 KOHM | | |
| R7 | 2.2 KOHM | | |
| R8 | 2.2 KOHM | | |
| R9 | 1.2 KOHM | | |
| R10 | 470 KOHM | | |
| R11 | 270 KOHM | | |
| R12 | 390 KOHM | | |
| R13 | 1 MOHM | | |
| R14 | 68 KOHM | | |
| R15 | 1.2 OHM | | |
| R16 | 47 KOHM | | |
| R17 | 4.7 KOHM | | |
| R18 | 4.7 KOHM | | |
| R19 | 4.7 KOHM | | |
| R20 | 4.7 KOHM | | |
| R21 | 10 MOHM | | |
| R22 | 4.7 KOHM | | |
| R23 | 10 KOHM | | |
| R24 | 470 OHM | | |
| R25 | 4.7 KOHM | | |
| R26 | 10 KOHM | | |
| R27 | 470 OHM | | |
| R28 | 47 KOHM | | |
| R29 | 10 KOHM | | |
| R30 | 10 KOHM | | |
| R31 | 47 KOHM | | |
| L1 | 0.68 uH | | |
| L2 | 4.7 uH | | |
| T1 | BFQ81 | | |
| T2 | BF599 | | |
| T3 | BC237 | | |
| T4 | BD437 | | |
| T5 | BD438 | | |
| T6 | BC237 | | |
| T7 | BD437 | | |
| T8 | BD438 | | |
| T9 | BC237 | | |
| D1 | 1N4148 | | |
| D2 | 1N5819 | | |
| D3 | 1N4007 | | |
| D4 | 1N4148 | | |
| D5 | 1N4148 | | |
| D6 | 1N4007 | | |
| IC1 | LM2904 | | |
| IC2 | LM2931 | D5.1 | |
| IC3 | MC33064D-5 | | |
| IC4 | MC68HC11 | | |
| IC5 | ULN 2003 | | |
| XT1 | 8 MHz | | |
| RL1 | RELAY | 12 V 16A (SIEMENS V23033-A1001-503) | |
| RL2 | RELAY | 12 V 16A (SIEMENS | |

TABLE 1-continued

V23033-A1001-503)

Figure 3:
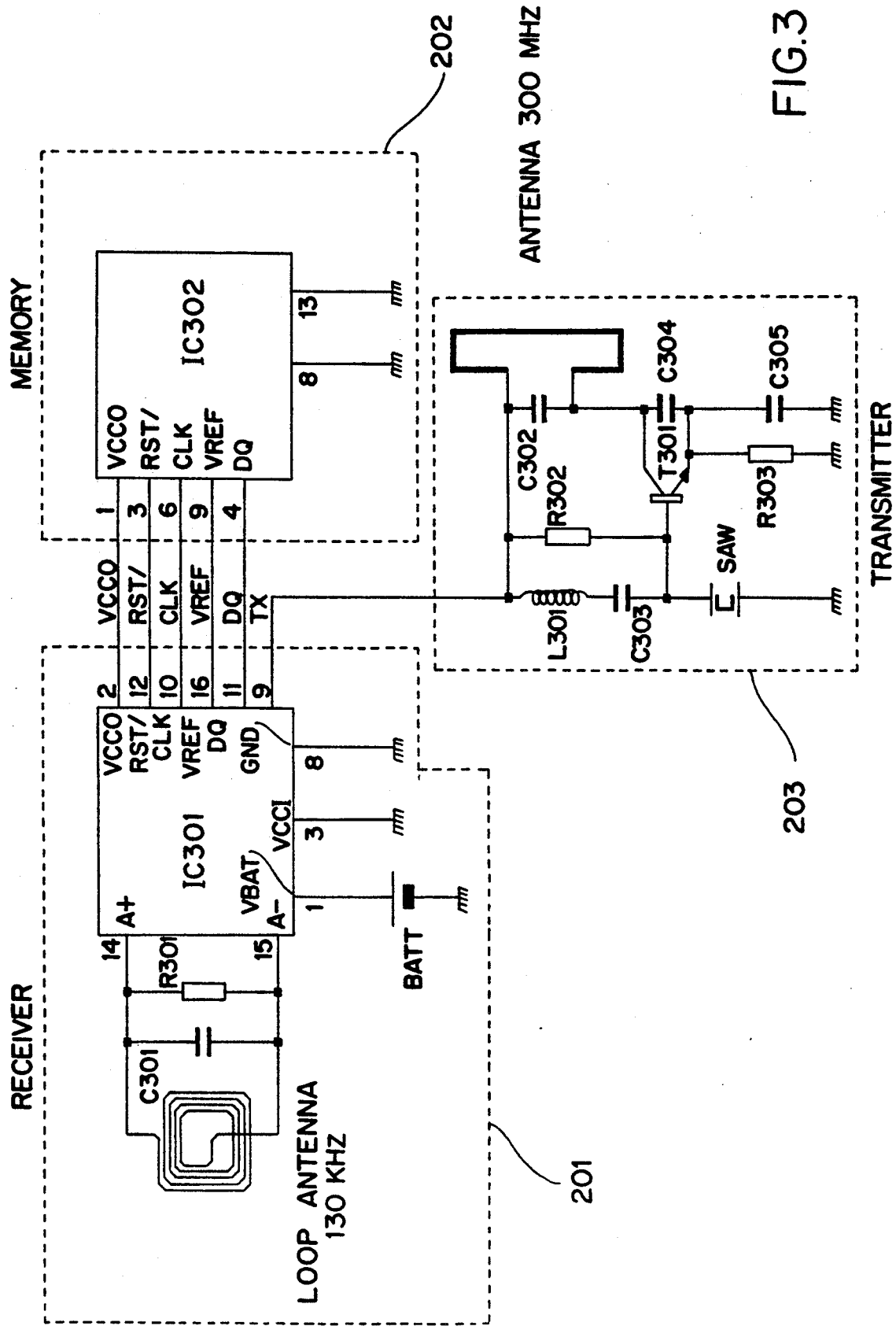
FIG. 3 is the generalized schematic of the control and command unit which is to be carried by the vehicle's user.

In FIG. 3 there are three principal blocks which combine to make up the control and command unit The receiver block (201) comprises a loop antenna for the very low frequency which is made by winding 200 turns in a rectangular shape of 55 mm × 15 mm. This wire diameter is 0.15 mm.

The antenna is coupled to C301 with which it becomes a resonant circuit. The resistance of the R301 serves to broaden the resonance point.

The signals at the antenna are received by component IC1 which converts them at its serial port into three signals, DQ (data), CLK (clock), and RST (reset) to be used in transmitting the memory block (202) as we will shortly see.

The receiver block (201), contains integrated circuit IC301 which interprets the packets of impulses which are received at the internal comparator and are then sent to the serial memory by means of the three wires, RST, CLK, and DQ.

Communication with the central unit takes place by sending data which appears on the TX output pin by means of the transmitter block (203).

Component IC301 is a sensitive, extremely low powered, comparator which is able to successfully use a signal as small as 25 mV whose frequency is no greater than 250 KHz.

IC301 is a comparator whose reception technique effectively gives it an automatic gain control to vary its threshold when local ambient noise could give it a false reading.

Component IC301 also contains a "power save circuit" to power the memory block (202) only when required in order to reduce the power drawn from the lithium battery contained in the control and command device.

The receiver block (201) is connected to memory block (202), which comprises only component IC302.

This is an integrated circuit whose contents cannot be altered and is addressed and allowed to be powered by the integrated circuit IC301.

Its contents are then serially read by the three wires DQ, CLK, and RST which have previously been mentioned.

Its operation will now be examined.

The transmitter block (203) receives, as we have seen, digital signals from block (201), which are, in turn, received from block (202).

Block (203) is a classic COLPITS oscillator with a SAW (surface acoustic wave) device to stabilize the fundamental frequency.

The antenna is part of the printed circuit board and has the following dimensions: length X width = 15 mm × 20 mm, width of the tracks is 1.6 mm, and is tuned to 300 MHz.

Tuning is accomplished by experimentally varying the value of capacitor C302.

Coil L301 and capacitor C303 allow the oscillator to start quickly.

C304 is the reaction capacitor and C305 is for emitter bypass.

T301 is the transistor oscillator and R302 and R303 are used to polarize it.

The above-mentioned components are specified in TABLE 2, which follows:

TABLE 2

| C301 | 10 nF | |
|---|---|---|
| C302 | 6.8 pF | |
| C303 | 10 nF | |
| C304 | 3.3 pF | |
| C305 | 100 pF | |
| R301 | 10 KOHM | |
| R302 | 62 KOHM | |
| R303 | 15 KOHM | |
| T301 | BF599 | |
| IC301 | DS1209S | DALLAS SEMICONDUCTOR |
| IC302 | DS1205S | DALLAS SEMICONDUCTOR |
| SAW | 300 MHz | SAR300IMB30X250 MURATA |
| LITHIUM BATTERY | CR2032 | 3V PANASONIC |

The system works as follows.

Figure 1:
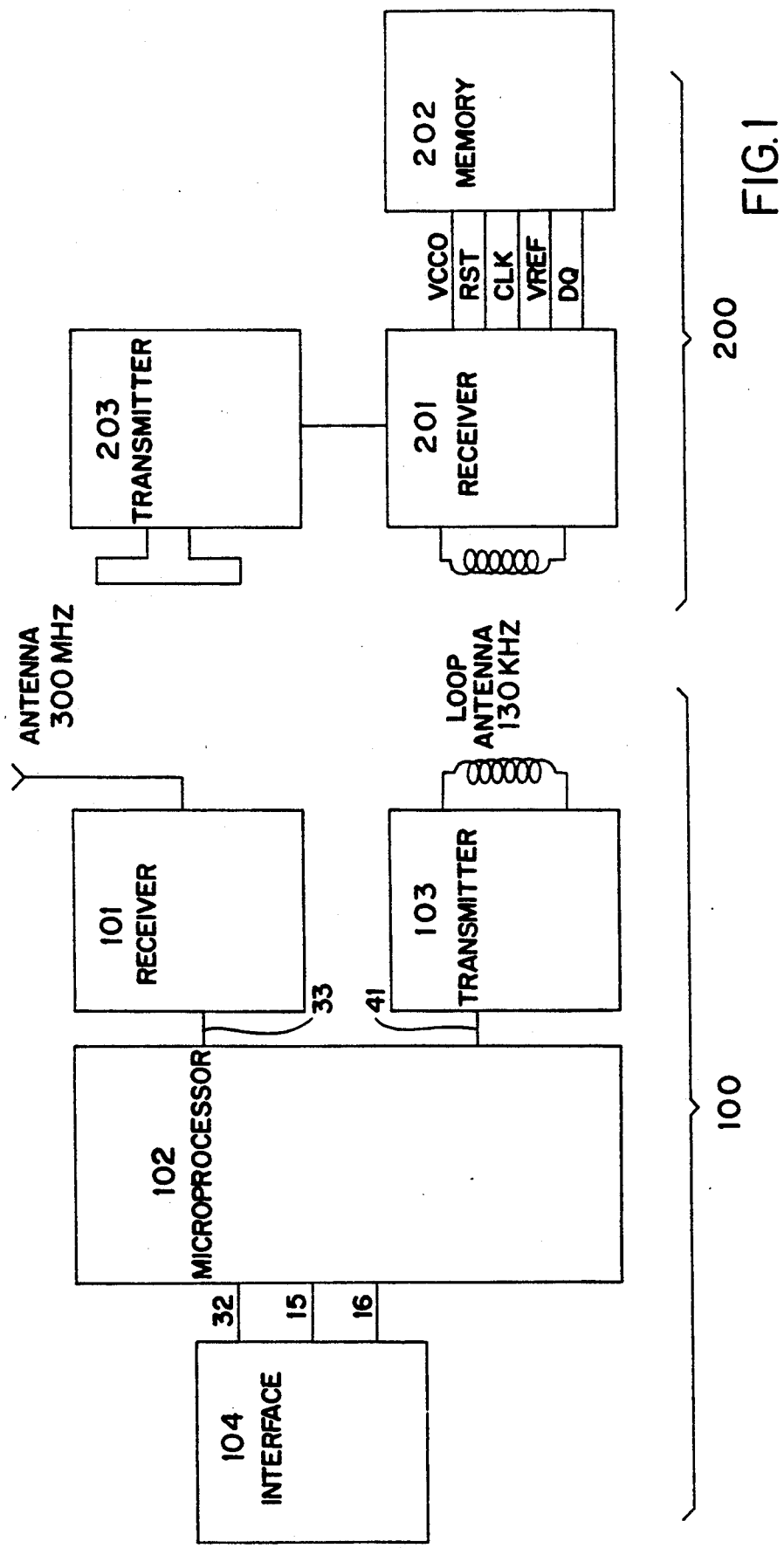
FIG. 1 is the schematic for the entire device.

The central unit (FIG. 1 and FIG. 2) emits a first signal at a first frequency, which in the illustrated case is a radio frequency (f1) of 130 KHz.

The control and command unit (FIG. 3), which is carried by the user, and could also be made part of the ignition key, is brought to the proximity of the central control unit and receives the signal just emitted by it.

This first signal (CODE1), which is in the form of a coded radio signal (f1), is received by the control and command device, which then activates itself and compares the coded message with the contents of its memory.

If the first signal (CODE1) is recognized, the control and command device will emit a code (CODE2) at a second frequency (f2) which will be received by the central unit.

In the illustrated example this second signal is sent at a frequency of 300 MHz.

Upon receiving this signal (CODE2), the central unit sends the next code (CODE3) chosen at random from those in its own memory on frequency (f1).

Upon receipt of this code, the command unit will respond with the proper associated code (CODE4) on frequency (f2).

The code associations are different for each system.

In the simplest form of this system, the central unit transmits the first signal continuously.

As an alternative, as in the present example, the first signal is emitted only when the ignition key is inserted and turned to energize the starter motor.

The time during which codes are exchanged can be limited, thanks to a timer, or they can be exchanged continuously during the entire time the vehicle is operating normally.

The microprocessor in the central unit works in such a way that in addition to acting to block operation of the vehicle's engine, it also automatically modifies the CODE3 which it transmits to the portable control and command unit on frequency (f1) (in this example, 130 KHz) and then awaits the proper CODE4 response which is different for each unit and each system.

Thus, when the engine is turned off, the system is automatically armed and the antitheft elements block the ability to start the engine eliminating the risk that one will forget to arm some device which needs to be turned on.

Additionally, the codes cannot be stolen by an eavesdropper in the vicinity, as we will now see.

The signals transmitted by the central unit can only be received for a very limited distance.

The transmission times are also very brief and the code exchanges (CODE1, CODE2, CODE3, CODE4) must occur within a very small time window.

All in all, the first signal will occur, as stated, only after the ignition key has been inserted and turned, and for only a very short time period.

I claim:

1. An antitheft system for vehicles of the type comprising.

a central unit able to inhibit or enable normal function of the vehicle engine responsive to a coded radio signal emitted by a portable unit, said portable unit being activated by a radio signal emitted by the central unit, in which the central unit comprises:

first memory, means to transmit at a first frequency a first coded radio signal CODE 3 chosen at random in a list of codes stored in said first memory, means to receive and recognize a second coded radio signal CODE 4;

the portable unit consisting of a control and command device comprising a second memory, means to receive and recognize the first coded radio signal CODE 3 emitted by the central unit, means to transmit at a second frequency a second coded radio signal CODE 4 chosen in a list of codes stored in said second memory and tied to the first coded radio signal CODE 3;

said central unit commanding the deactivation of the antitheft system which inhibits the vehicle's engine responsive to said second coded radio signal, each first coded radio signal stored in said first memory corresponding to only one second coded radio signal stored in said second memory.

2. The antitheft system according to claim 1, in which the said first and/or second memory are EEPROM.

3. The antitheft system according to claim 1, in which the said first and/or second memory are ROM.

4. Antitheft device according to claim 1, in which said first coded radio signal CODE3 is emitted from the central unit responsive to an external command.

5. The antitheft system according to claim 1, in which the means to transmit said first coded radio signal comprise a microprocessor programmed so as to furnish a coded signal at some radio frequency to a transmitter comprising two identical transistor pairs in a push-pull configuration tied to a loop antenna.

6. The antitheft system according to claim 1, in which the means to receive and recognize said first coded radio signal and to transmit said second coded radio signal comprise a resonant loop antenna of said first frequency connected to an integrated circuit DS 1209S which is, in turn, interfaced to a memory DS 1205S, also in the form of an integrated circuit, able to drive a surface acoustic wave stabilized COLPITTS type oscillator attached to an antenna.

7. The antitheft system according to claim 1, in which said first frequency and said second frequency are the same frequency, means being provided to avoid overlapping of said first coded radio signal and second coded radio signal. second coded radio signal.

8. Antitheft device according to claim 1, in which said control and command device is attached by a band to the vehicle's ignition key.

9. An antitheft system for vehicles containing engines comprising, a central unit able to inhibit or enable normal function of the vehicle engine responsive to a coded radio signal emitted by a portable unit, said portable unit being activated by a radio signal emitted by the central unit, in which the central unit comprises:

(a) first memory storing a list of codes, (b) means to transmit at a first frequency a first coded radio signal chosen at random from the list of codes stored in said first memory, (c) means to receive and recognize a second coded radio signal, the portable unit including a control and command device comprising:

(a) a second memory containing a list of codes, each code associated with one of the codes in the first memory, (b) means to receive and recognize the first coded radio signal emitted by the central unit, (c) means to transmit at a second frequency a second coded radio signal chosen from the list of codes stored in said second memory and associated with the first coded radio signal, said central unit commanding the deactivation of the antitheft system which inhibits the vehicle's engine responsive to said second coded radio signal, each first coded radio signal stored in said first memory corresponding to only one second coded radio signal stored in said second memory.

10. The antitheft system of claim 1, wherein the first memory and the second memory each contains plural lists of the same codes.

* * * * *